«12» United States Patent
Mikami

(10) Patent No.: US 10,160,929 B2
(45) Date of Patent: Dec. 25, 2018

(54) ROTATION TRANSMITTING APPARATUS WITH BUILT-IN ONE-WAY CLUTCH

(75) Inventor: Hidenobu Mikami, Kuwana (JP)

(73) Assignee: NTN CORPORATION, Osaka (JP)

( * ) Notice: Subject to any disclaimer, the term of this patent is extended or adjusted under 35 U.S.C. 154(b) by 1674 days.

(21) Appl. No.: 11/921,821

(22) PCT Filed: Jun. 9, 2006

(86) PCT No.: PCT/JP2006/311596
§ 371 (c)(1),
(2), (4) Date: Dec. 7, 2007

(87) PCT Pub. No.: WO2006/132349
PCT Pub. Date: Dec. 14, 2006

(65) Prior Publication Data
US 2009/0124400 A1    May 14, 2009

(30) Foreign Application Priority Data
Jun. 10, 2005   (JP) .................................. 2005-171297

(51) Int. Cl.
*C10M 169/06* (2006.01)
*F16D 41/07* (2006.01)
(Continued)

(52) U.S. Cl.
CPC ....... *C10M 169/06* (2013.01); *F16C 33/6633* (2013.01); *F16D 41/07* (2013.01);
(Continued)

(58) Field of Classification Search
CPC ............ C10N 2210/02; C10N 2210/01; C10N 2220/022; C10N 2230/06; C10N 2240/02;
(Continued)

(56) References Cited

U.S. PATENT DOCUMENTS 5,650,380 A * 7/1997 Fletcher ........................ 508/168
6,037,314 A * 3/2000 Kondo et al. ................ 508/363
(Continued)

FOREIGN PATENT DOCUMENTS

EP        1510569 A1 *  3/2005
JP       11-082688       3/1999
(Continued)

*Primary Examiner* — Jacob S. Scott
(74) *Attorney, Agent, or Firm* — Hedman & Costigan, P.C.; James V. Costigan; Kathleen A. Costigan

(57) ABSTRACT

The present invention provides a rotation-transmitting apparatus with a built-in one-way clutch which is capable of preventing rolling contact surfaces and rolling surfaces of inner and outer rings of a rolling bearing from peeling and fretting wearing and is excellent in its resistance to heat and wear. The rotation-transmitting apparatus with a built-in one-way clutch has an inside rotational member; a cylindrical outside rotational member disposed concentrically with the inside rotational member; a one-way clutch connecting the outside surface of the inside rotational member and the inside surface of the outside rotational member to each other only when the outside rotational member rotates at a higher speed than the inside rotational member; and a pair of rolling bearings allowing the inside rotational member and the outside rotational member to rotate relative to each other. Grease is enclosed inside an internal space of a clutch where a plurality of rollers is mounted and inside a space of the bearing where a plurality of rolling elements is mounted. The grease contains a base oil, a thickener, and an additive. The base oil is PAO oil. As the additive, 0.01 to 15 wt % of at leas one compound selected from among ZnDTC and ZnDTP is contained for the entire amount of the grease.

2 Claims, 3 Drawing Sheets

(51) Int. Cl.
  *F16C 33/66* (2006.01)
  *F16C 19/06* (2006.01)
(52) U.S. Cl.
  CPC ............ *C10M 2203/1006* (2013.01); *C10M 2205/0206* (2013.01); *C10M 2205/0285* (2013.01); *C10M 2207/106* (2013.01); *C10M 2215/064* (2013.01); *C10M 2215/1026* (2013.01); *C10M 2219/068* (2013.01); *C10M 2223/045* (2013.01); *C10N 2210/02* (2013.01); *C10N 2220/022* (2013.01); *C10N 2230/06* (2013.01); *C10N 2240/02* (2013.01); *C10N 2250/10* (2013.01); *F16C 19/06* (2013.01); *F16C 2361/63* (2013.01)
(58) Field of Classification Search
  CPC ........ C10N 2250/10; C10M 2207/106; C10M 2219/068; C10M 2223/045; C10M 169/06; C10M 2203/1006; C10M 2205/0206; C10M 2205/0285; C10M 2215/064; C10M 2215/1026; F16C 33/6633; F16D 41/07
  USPC ............ 192/113.32, 45; 11/113.32; 508/363, 508/371, 552
  See application file for complete search history.

(56) References Cited

U.S. PATENT DOCUMENTS

| | | | | |
|---|---|---|---|---|
| 6,343,682 | B1 * | 2/2002 | Terada et al. ................... | 192/45 |
| 6,403,538 | B1 * | 6/2002 | Ozaki et al. .................. | 508/367 |
| 6,605,574 | B2 * | 8/2003 | Asao et al. ................... | 508/376 |
| 7,265,080 | B2 * | 9/2007 | Iso et al. ....................... | 508/182 |
| 2002/0107150 | A1 * | 8/2002 | Mikami et al. ............... | 508/100 |
| 2004/0224859 | A1 * | 11/2004 | Numazawa et al. .......... | 508/364 |
| 2007/0254817 | A1 * | 11/2007 | Griffo et al. .................. | 508/363 |
| 2008/0271967 | A1 * | 11/2008 | Nakatani et al. .............. | 192/45 |

FOREIGN PATENT DOCUMENTS

| | | |
|---|---|---|
| JP | 11-269478 | 10/1999 |
| JP | 2000-234638 | 8/2000 |
| JP | 2000-253620 | 9/2000 |
| JP | 2004-018597 | 1/2004 |
| JP | 2005-003197 A | 1/2005 |
| JP | 2005-008825 | 1/2005 |
| JP | 2005-337350 | 12/2005 |
| JP | 2006-077967 | 3/2006 |
| JP | 2006-200561 | 8/2006 |
| WO | WO 2006001309 A1 * | 1/2006 |

* cited by examiner

ROTATION TRANSMITTING APPARATUS WITH BUILT-IN ONE-WAY CLUTCH

TECHNICAL FIELD

A rotation-transmitting apparatus with a built-in one-way clutch of the present invention is used by mounting it, for example, on a rotational shaft of an alternator of a car and on a driving shaft of a starter motor for starting a drive engine of a car including a car having a so-called "idling-stop function" (i.e. a car with a system for automatically causing the engine to stop when the car pauses, thereby protecting the environment and getting good mileage). The present invention relates to the rotation-transmitting apparatus with the built-in one-way clutch for use in the above-described various applications and particularly to the apparatus in which a distinctive grease composition is enclosed.

BACKGROUND ART

Owing to the spread of an FF (Front engine, Front wheel drive) car aimed at the development of a small lightweight car and also to an increase of a residential space in the car, an engine room of the car is increasingly forced to become small. Therefore electric auxiliary machines for use in the car are made increasingly small and lightweight. Further there is a growing demand for the development of high-performance and high-output electric auxiliary machines.

As representative electric auxiliary machines for use in the car, there are a fan-coupling apparatus which makes an optimum ventilation corresponding to the temperature of the engine and an alternator which receives the rotation of the engine with its belt and generates electricity, thus supplying an electric power to an electric load of the car and has a function of charging a battery. These electric auxiliary machines are used to efficiently utilize the rotational torque of an engine through a one-way clutch which is connected to an engine output shaft only when the engine is in a predetermined output state. The rotation-transmitting apparatus with a built-in one-way clutch mounted on the electric auxiliary machine for the car is frequently connected to and disconnected from the engine output shaft. When the rotation-transmitting apparatus with the built-in one-way clutch is connected to the engine output shaft, it has a high rotational speed. Consequently a high load is applied to the rotation-transmitting apparatus with the built-in one-way clutch, and it generates a large amount of heat and vibration. The use condition for the rotation-transmitting apparatus with the built-in one-way clutch has become strict as the car has come to have high performance and output.

Because the use condition for the rotation-transmitting apparatus with the built-in one-way clutch has become strict, when rolling bearings rotate, namely, when a roller clutch overruns, the hydrogen brittleness-caused peeling phenomenon is liable to occur with the rolling contact surfaces of balls and the rolling surfaces of inner and outer rings constructing the rolling bearing turning into white in the textures thereof. In addition, when the rolling bearings do not rotate, namely, when the roller clutch is locked, fretting wear is liable to occur at the contact portions between the rolling contact surfaces of the balls and the rolling surface of each of the inner and outer rings. Therefore grease which is enclosed in a space where the balls are mounted is desired to prevent the generation of the peeling and fretting wear.

The electric auxiliary machine on which the rotation-transmitting apparatus with the built-in one-way clutch is mounted is frequently installed on a lower portion of an engine room. Thus while a car is travelling, rainwater is liable to penetrate into the rotation-transmitting apparatus with the built-in one-way clutch. When the rainwater penetrates into the space in which the balls of rolling bearings are mounted, the rolling contact surfaces of the balls and the rolling surface of each of the inner and outer rings are liable to be corroded. Therefore the grease which is enclosed in the space in which the balls of the rolling bearings are mounted is required to have rust-preventing performance superior to that of grease which is used in other portions.

In the one-way clutch of the rotation-transmitting apparatus with the built-in one-way clutch for use in the alternator, the one using grease containing ether oil as its base oil (see patent document 1), the one using grease whose viscosity pressure coefficient is not less than a predetermined value (see patent document 2), and the one using grease containing synthetic oil whose kinematic viscosity at 40° C. is not more than 60 mm$^2$/second as its base oil (see patent document 3) are known.

But in patent document 1, the one-way clutch using the grease containing the ether oil as its base oil has a problem that it has an insufficient low frictional wear property when the one-way clutch is in an overrun state. In the patent document 2, the use of the grease whose viscosity pressure coefficient is not less than the predetermined value is effective for securely realizing a locked state, but has a problem that the grease is incapable of sufficiently restraining wear in the overrun state. In the patent document 3, the grease containing the synthetic oil whose kinematic viscosity is low has an insufficient heat resistance. Thus it is difficult to use the grease for a long time.

Patent document 1: Japanese Patent Application Laid-Open No. 11-82688

Patent document 2: Japanese Patent Application Laid-Open No. 2000-234638

Patent document 3: Japanese Patent Application Laid-Open No. 2000-253620

DISCLOSURE OF THE INVENTION

Problems to be Solved by the Invention

The present invention has been made to solve the above-described problems. Therefore it is an object of the present invention to provide a rotation-transmitting apparatus with a built-in one-way clutch which is capable of preventing rolling contact surfaces of rollers of a one-way clutch and rolling surfaces of inner and outer rings of a rolling bearing from peeling and fretting wearing and is excellent in its resistance to heat and wear.

Means for Solving the Problems

A rotation-transmitting apparatus with a built-in one-way clutch of the present invention includes an inside rotational member; a cylindrical outside rotational member disposed concentrically with the inside rotational member; a one-way clutch disposed between an outside surface of the inside rotational member and an inside surface of the outside rotational member and connecting the outside surface of the inside rotational member and the inside surface of the outside rotational member to each other only when the outside rotational member rotates at a higher speed than the inside rotational member; and a pair of rolling bearings disposed at both sides of the one-way clutch in an axial direction thereof and allowing the inside rotational member and the outside rotational member to rotate relative to each other with the rolling bearings receiving a radial load applied between the inside rotational member and the outside rotational member. Grease is enclosed inside an internal space of a clutch where a plurality of rollers composing the one-way clutch is mounted and inside a space where a plurality of rolling elements composing the rolling bearings is mounted. The grease contains a base oil, a thickener, and an additive. The base oil is poly-α-olefin (hereinafter referred to as PAO) oil; and as the additive, 0.01 to 15 wt % of at leas one compound selected from among dithiozinc carbamate (hereinafter referred to as ZnDTC) and dithiozinc phosphate (hereinafter referred to as ZnDTP) is contained for the entire amount of the grease.

The PAO oil has a kinematic viscosity of 30 to 70 mm²/s at 40° C. The kinematic viscosity of the PAO oil is measured in accordance with JIS K 2283.

The mixing ratio of the PAO oil is set to 70 to 95 wt % for the entire amount of the grease.

The thickener is a urea-based compound indicated by a formula (1) shown below:

[Chemical formula 2]

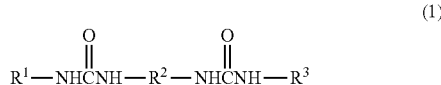

(1)

(in the formula (1), $R^1$ and $R^3$ indicate hydrocarbon groups having carbon atoms of 6 to 20. $R^1$ and $R^3$ may be identical to or different from each other. $R^2$ indicates an aromatic hydrocarbon group having carbon atoms of 6 to 15.)

The urea-based compound is prepared by a reaction between diisocyanate and monoamine. The diisocyanate is diphenylmethane diisocyanate. The monoamine is at least one substance selected from among octylamine, cyclohexylamine, and p-toluidine.

Effect of the Invention

Because the grease containing the PAO oil as its base oil and 0.01 to 15 wt % of at least one compound, selected from among the ZnDTC and the ZnDTP, which is added to the entire amount of the grease is used for the one-way clutch and the rolling bearing of the rotation-transmitting apparatus with the built-in one-way clutch of the present invention, the one-way clutch and the rolling bearing are capable of keeping a wear-preventing effect for a long time. Therefore it is possible to prevent rolling contact surfaces of rollers of the one-way clutch and rolling surfaces of inner and outer rings of the rolling bearing from peeling and fretting wearing, and to keep the wear resistance and durability of the rotation-transmitting apparatus with the built-in one-way clutch for a long time.

BEST MODE FOR CARRYING OUT THE INVENTION

As a result of investigations into rotation-transmitting apparatuses with a built-in one-way clutch in which grease containing a wear-preventing agent is enclosed, it has been found that a rotation-transmitting apparatus with a built-in one-way clutch in which grease containing the PAO oil as its base oil and 0.01 to 15 wt % of at least one compound, selected from among the ZnDTC and the ZnDTP, which is added to the entire amount of the grease is enclosed wears to a lower extent and has a higher long-term durability in a state in which a high load is applied and a sliding motion takes place than a rotation-transmitting apparatus with a built-in one-way clutch in which grease containing an additive other than the ZnDTC and the ZnDTP is enclosed. This is because the ZnDTC and the ZnDTP are capable of keeping a wear-preventing effect for a longer time than other substances. The present invention is based on this finding.

The rotation-transmitting apparatus with a built-in one-way clutch of the present invention is described below with reference to FIG. 1. FIG. 1 is a sectional view showing the rotation-transmitting apparatus with a built-in one-way clutch. The rotation-transmitting apparatus with a built-in one-way clutch has a pulley 10 (outside rotational member) and a sleeve 9 (inside rotational member) as a pair of rotational members disposed concentrically. A pair of rolling bearings 1, 1 and a roller clutch 11, which is a one-way clutch, are provided between an inside surface of the pulley 10 and an outside surface of the sleeve 9.

The pulley 10 is formed entirely cylindrically, and by waving a sectional configuration of the outside surface thereof in a widthwise direction thereof, a part of an annular belts called a poly V-belt can be spanned freely. The sleeve 9 is formed entirely cylindrically and is fixedly fitted on a rotational shaft of an auxiliary machine such as an alternator to freely rotate the sleeve 9 together with the rotational shaft. At both ends of a cylindrical space disposed between the inside surface of the pulley 10 and the outside surface of the sleeve 9, the roller bearings 1, 1 are mounted at a position where the roller clutch 11 is sandwiched between both sides thereof in the axial direction thereof, and the roller clutch 11 is installed at an intermediate portion of the cylindrical space in its axial direction.

The roller clutch 11 freely transmits a rotational force between the pulley 10 and the sleeve 9 only when the pulley 10 rotates in a predetermined direction relative to the sleeve 9. The roller clutch 11 is constructed of an inner ring 12 for the clutch, an outer ring 13 for the clutch, a plurality of rollers 14, a cage 15 for the clutch, and an unshown spring. The outer ring 13 for the clutch and the inner ring 12 for the clutch are fixedly fitted on the inside surface of the intermediate portion of the pulley 10 and the outside surface of the intermediate portion of the sleeve 9 respectively by shrink fit. The inside surface of the intermediate portion of the outer ring 13 for the clutch is set as merely a cylindrical surface. The outside surface of the inner ring 12 for the clutch is formed as a cam surface 16. That is, a plurality of concavities 17 called a lamp portion is formed at regular intervals in the circumferential direction of the outside surface of the inner ring 12 for the clutch to form the outside surface of the inner ring 12 for the clutch as the cam surface 16.

Between the inside surface of the intermediate portion of the outer ring 13 and the cam surface 16, there are provided a plurality of the rollers 14 and the cage 15, for the clutch, for supporting the rollers 14 in correspondence to rolling thereof and a small amount of displacement thereof in the circumferential direction thereof. The cage 15 for the clutch is entirely made of synthetic resin. An inner peripheral edge of the cage 15 for the clutch is engaged by a part of the cam surface 16 to prevent the cage 15 from rotating relatively to the inner ring 12 for the clutch. In the example shown in FIG. 1, a convexity 18 formed on the inside surface of an end of the cage 15 for the clutch is sandwiched between a level-different surface 19 formed on the outside surface of the sleeve 9 and an axial end surface of the inner ring 12 for the clutch to axially place the cage 15 for the clutch in position. Between the rollers 14 and the cage 15 for the clutch, a spring (not shown) for pressing the rollers 14 in the same direction (direction in which the concavities 17 become shallow) as the circumferential direction is provided.

In constructing the roller clutch 11, there is a case in which the cylindrical surface and the cam surface 16 which contact a plurality of the rollers 14 are directly formed on the inside surface of the pulley 10 and the outside surface of the sleeve 9 respectively. There is also a case in which the position of the radial disposition of the cylindrical surface and that of the cam surface 16 are opposite to that in the above-described construction.

A pair of the rolling bearings 1, 1 allows the pulley 10 to rotate relative to the sleeve 9 with the roller bearings 1, 1 supporting a radial load applied to the pulley 10. As the roller bearings 1, 1, deep groove ball bearings are used in FIG. 1. That is, as shown in detail in FIG. 2 which is a sectional view of the deep groove ball bearing, each of the rolling bearings 1, 1 has an inner ring 2 having a deep-groove inner ring rolling surface 2a on its outside surface and fixedly fitted on both ends of a sleeve 9, an outer ring 3 having a deep-groove outer ring rolling surface 3a on its inside surface and fixedly fitted on both ends of a pulley 10, and a plurality of balls (rolling elements) 4 which are rollably disposed between the inner ring rolling surface 2a and the outer ring rolling surface 3a with the rolling elements 4 held by a cage 5. Both-end openings of a space, where balls 4 are provided, which is disposed between the outside surface of the inner ring 2 and the inside surface of the outer ring 3 are sealed with a sealing member 6. Thereby it is possible to prevent a grease 7 enclosed in the space where the balls 4 are provided from leaking to the outside and prevent a foreign matter such as dust from penetrating into the space.

In the rotation-transmitting apparatus with a built-in one-way clutch having the above-described construction, the sleeve 9 is fixedly fitted on the end of the rotational shaft of an electric auxiliary machine for a car such as an alternator, and the annular belt is spanned over the outside surface of the pulley 10. The annular belt is spanned on a driving pulley fixed to an end of a crankshaft of an engine or the like and is driven by rotation of the driving pulley. In the rotation-transmitting apparatus with a built-in one-way clutch in which the component parts are assembled in this manner, when the running speed of the annular belt becomes low, the rotation of the pulley 10 relative to the rotational shaft is free. On the other hand, when the running speed of the annular belt is constant or becomes high, the rotational force is freely transmitted from the pulley 10 to the rotational shaft. Consequently even when the rotational angular speed of the crankshaft fluctuates, it is possible to prevent the pulley 10 and the annular belt from rubbing each other, an abnormal sound called judder from being generated, the life of the annular belt from being decreased by wear, and the alternator from deteriorating in its power generation efficiency.

Supposing that one of the electric motor of the electric auxiliary machine for a car and the engine is in operation and the other is in a stopped state, by using the rotation-transmitting apparatus with a built-in one-way clutch, it is possible to freely transmit the rotational force from the rotational shaft of one of the electric motor and the engine to the pulley 10 and prevent the rotation of the rotational shaft of the other. For example, by mounting the rotation-transmitting apparatus with a built-in one-way clutch on the end of the electric motor of the electric auxiliary machine for a car and on the end of the driving shaft of the crankshaft, the rotation-transmitting apparatus with a built-in one-way clutch can be utilized as an auxiliary machine-driving apparatus when the engine is stopped by a so-called "idling-stop function."

The ZnDTC which is added to the grease enclosed in the rotation-transmitting apparatus with the built-in one-way clutch of the present invention is called zinc sulfide dialkyldithiocarbamate and expressed by a formula (2) shown below:

[Chemical formula 3]

(2)

In the formula (2), $R^4$ and $R^5$ indicate aliphatic hydrocarbon groups having carbon atoms of 1 to 24 and preferably 3 to 18.

As a commercially available product of the ZnDTC, Vanlube AZ (produced by R.T. Vanderbilt Company Inc.) can be used.

The ZnDTP which is added to the grease enclosed in the rotation-transmitting apparatus with the built-in one-way clutch of the present invention is called zinc dithiophosphate and expressed by a formula (3) shown below:

[Chemical formula 4]

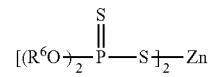

(3)

In the formula (3), $R^6$ indicates an aliphatic hydrocarbon group having carbon atoms of 1 to 24 or an aromatic hydrocarbon group having carbon atoms of 6 to 30.

As a commercially available product of the ZnDTP, LZ1095 (produced by The Lubrizol Corporation) can be used.

The mixing ratio of at least one compound, selected from among the ZnDTC and the ZnDTP, which can be used in the present invention, is set to 0.01 to 15 wt % and preferably 0.5 to 5 wt % for the entire amount of the grease. If the mixing ratio is less than 0.01 wt %, it is difficult to obtain a desired effect. If the mixing ratio is more than 15 wt %, there is no increase in the effect and there is a disadvantage in the cost.

As the base oil that can be used for the grease for use in the rotation-transmitting apparatus with the built-in one-way clutch of the present invention, it is preferable to use PAO oil. As the PAO oil, normally, mixtures of oligomers or polymers consisting of α-olefin or isomerized α-olefin are listed. As examples of the α-olefin, it is possible to list 1-octene, 1-nonen, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetracosene. Normally mixtures of these substances are used.

It is preferable that the base oil which can be used for the grease to be enclosed in the rotation-transmitting apparatus with the built-in one-way clutch of the present invention has a kinematic viscosity of 30 to 70 mm$^2$/s and especially preferably 40 to 60 mm$^2$/s at 40° C. It is not preferable that the base oil has a kinematic viscosity less than 30 mm²/s because the evaporation loss thereof increases and resistance thereof to heat deteriorates. It is not preferable that the kinematic viscosity of the base oil exceeds 70 mm²/s because owing to an increase in a rotational torque, the temperature of the rolling contact surface of the roller of the clutch and that of the rolling contact surface of the balls of the rolling bearing rise greatly.

It is preferable that the mixing ratio of the base oil is set to 70 to 95 wt % for the entire amount of the grease. If the mixing ratio of the base oil is less than 70 wt %, the amount of the lubricating oil is small and an inferior lubrication is liable to take place. If the mixing ratio of the base oil is more than 95 wt %, the grease is liable to soften and leak.

As thickeners that can be used for the grease to be enclosed in the rotation-transmitting apparatus with the built-in one-way clutch of the present invention, a metal soap thickener such as aluminum soap, lithium soap, sodium soap, composite lithium soap, composite calcium soap, and composite aluminum soap; and a urea-based compound such as a diurea compound and a polyurea compound are listed. In consideration of durability and fretting resistance, the urea-based compound is preferable. The urea-based compound is expressed as an example by a chemical formula (1) shown below.

[Chemical formula 5]

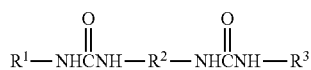

(1)

In the formula (1), $R^1$ and $R^3$ indicate hydrocarbon groups having carbon atoms of 6 to 20. $R^1$ and $R^3$ may be identical to or different from each other. $R^2$ indicates an aromatic hydrocarbon group having carbon atoms of 6 to 15. It is preferable that $R_1$ and $R_3$ are aromatic hydrocarbon groups having carbon atoms of 6 to 12, alicyclic hydrocarbon groups having carbon atoms of 6 to 20 or aliphatic hydrocarbon groups having carbon atoms of 6 to 20.

The urea-based compound is prepared by a reaction between an isocyanate compound and an amine compound. To prevent a reactive free radical from remaining, it is preferable to use the isocyanate compound and the amine compound in such a way that the equivalent weight of the isocyanate group of the isocyanate compound and that of the amino group of the amine compound are approximately equal to each other.

The diurea compound indicated by the formula (1) is prepared by a reaction, as an example, between diisocyanate and monoamine. As the diisocyanate, phenylene diisocyanate, diphenyl diisocyanate, diphenylmethane diisocyanate, 1,5-naphthylene diisocyanate, 2,4-trilene diisocyanate, 3,3-dimethyl-4,4-biphenylene diisocyanate, octadecane diisocyanate, decane diisocyanate, and hexane diisocyanate are listed. As the monoamine, octylamine, dodecylamine, hexadecylamine, stearylamine, oleylamine, aniline, p-toluidine, and cyclohexylamine are listed.

The prepared diurea compound may be used as the thickener singly or in combination of not less than two kinds thereof.

The reaction between the monoamine and the diisocyanate are made as follows: For example, after the monoamine and the diisocyanate are reacted sufficiently with each other in the base oil having a temperature of 70 to 110° C., the temperature is risen to 120 to 180° C. at which the reactant is maintained for 1 to 2 hours. Thereafter the reactant is cooled, and homogenizing treatment is carried out by using a homogenizer, a three-roll mill or the like to produce base grease to which various additives are to be added.

It is preferable that the worked penetration of the grease which can be used for the rotation-transmitting apparatus with the built-in one-way clutch of the present invention is in the range from 200 to 400. The worked penetration is measured in accordance with JIS K 2220. If the worked penetration is less than 200, the lubricating performance of the grease composition at a low temperature is low. If the worked penetration exceeds 400, the grease composition is liable to leak, which is not preferable.

As may be necessary, known additives can be contained in the grease for use in the rotation-transmitting apparatus with the built-in one-way clutch of the present invention. For example, as the additives, it is possible to list an antioxidant such as an organic zinc compound, an amine-based antioxidant, a phenol-based antioxidant or sulfur-based antioxidant; a metal-inactivating agent such as benzotriazole and sodium nitrite; a viscosity index improver such as polymethacrylate and polystyrene; and a solid lubricant such as molybdenum disulfide and graphite. These additives can be added to the grease singly or in combination of not less than two kinds thereof.

EXAMPLES

Examples 1 through 9

In a reaction container, after a thickener was added to a base oil, homogenizing treatment was carried out by using a three-roll mill to prepare urea/PAO oil-based grease (viscosity of base oil at 4° C.: 46 mm²/second) shown in table 1. As additives, ZnDTC, ZnDTP, and an amine-based antioxidant (NOCRAC AD-F produced by Ouchi Shinko Chemical Industrial Co., Ltd.) were added to the above-described grease at ratios shown in table 1 to form the grease of each example. An extreme-pressure property evaluation test and a high-temperature and high-speed test were conducted on each prepared grease. Results are shown in table 1.

Comparative Examples 1 through 6

In a reaction container, after a thickener was added to a base oil, homogenizing treatment was carried out by using a three-roll mill to prepare lithium soap/mineral oil-based grease (viscosity of base oil at 40° C.: 100 mm²/second) and the urea/PAO oil-based grease (viscosity of base oil at 40° C.: 46 mm²/second) shown in table 1. As additives, molybdenum dithiocarbamate and the amine-based antioxidant (NOCRAC AD-F produced by Ouchi Shinko Chemical Industrial Co., Ltd.) were added to the above-described grease at ratios shown in table 1 to form the grease of each comparative example. In a manner similar to that of the examples, the extreme-pressure property evaluation test and the high-temperature and high-speed test were conducted on each prepared grease. Results are shown in table 1.

Extreme-Pressure Property Evaluation Test

An apparatus for conducting extreme-pressure property evaluation test is shown in FIG. 3. The apparatus for conducting the evaluation test was constructed of a ring-shaped specimen 21 of φ40×10 fixed to a rotational shaft 20 and a ring-shaped specimen 22 whose end surface is rubbed with an end surface 23 of the specimen 21. The grease for the roller bearing was applied to the end surface 23, and the rotational shaft 20 was rotated at 2000 rpm. An axial load of 490N in the right-hand direction A in FIG. 3 and a radial load of 392N were applied to evaluate the extreme-pressure property thereof. The extreme-pressure property was evaluated by measuring vibrations of the rotational shaft 20 generated owing to an increase of the frictional wear of sliding portions of both specimens by using a vibration sensor. The test was conducted until the vibration value of the rotational shaft 20 became twice as large as an initial vibration value thereof. The period of time it took for the vibration value thereof to become twice as large as the initial vibration value thereof was measured.

The longer is the period of time it took for the vibration value of the rotational shaft 20 to become twice as large as the initial value thereof, the larger is the extreme-pressure property effect, and hence excellent resistance to heat and durability are shown. Therefore the heat resistance and durability of the grease of each of the examples and the comparative examples were evaluated by comparing the above-described measured time periods with one another.

High-Temperature and High-Speed Test

An amount of 1.8 g of the grease prepared in each example and each comparative example was enclosed in a rolling bearing (size of bearing: inner diameter of φ20 mm×outer diameter of φ47 mm×width of 14 mm). The rolling bearing was rotated at 10000 rpm in conditions where the temperature of the outside portion of an outer ring thereof was 150° C. and radial and axial loads of 67 N were respectively applied thereto to measure the period of time it took for the rolling bearing to be seized.

Comprehensive Evaluation

The grease which allowed the period of time it took for the vibration value of the rotational shaft 20 to become twice as large as the initial vibration value thereof to be not less than 140 hours in the extreme-pressure property evaluation test and also the period of time it took for the rolling bearing to be seized to be not less than 2300 hours in the high-temperature and high-speed test was evaluated as being excellent in allowing the rotation-transmitting apparatus with the built-in one-way clutch to have a high wear resistance and durability, and judged as "good" in table 1. The grease other than the above-described grease was evaluated as being unacceptable and judged as "bad" in table 1.

TABLE 1

| | Example | | | | | | | | |
|---|---|---|---|---|---|---|---|---|---|
| | 1 | 2 | 3 | 4 | 5 | 6 | 7 | 8 | 9 |
| Mixing ratio (wt %) Grease Base oil | | | | | | | | | |
| PAO oil[1] | 77 | 75 | 77 | 72 | 76 | 71 | 75 | 79.9 | 66 |
| Mineral oil | — | — | — | — | — | — | — | — | — |
| Thickener | | | | | | | | | |
| Octylamine | — | — | 8.1 | — | 4.6 | — | 4.7 | — | — |
| Cyclohexylamine | 8 | 8 | — | — | 3.5 | 4.8 | — | 8 | 8 |
| p-toluidine | — | — | — | 9.7 | — | 5.2 | 4 | — | — |
| Diphenylmethane diisocyanate[2] | 10 | 10 | 7.9 | 11.3 | 8.9 | 12 | 9.3 | 10 | 10 |
| Lithium soap | — | — | — | — | — | — | — | — | — |
| Additive | | | | | | | | | |
| ZnDTC[3] | 3 | 5 | 5 | 5 | 5 | 5 | 5 | 0.1 | 14 |
| ZnDTP[4] | 1 | — | — | — | — | — | — | — | — |
| MoDTC[5] | — | — | — | — | — | — | — | — | — |
| Amine-based antioxidant | 1 | 2 | 2 | 2 | 2 | 2 | 2 | 2 | 2 |
| Viscosity of base oil (mm$^2$/s, 40° C.) | 46 | 46 | 46 | 46 | 46 | 46 | 46 | 46 | 46 |
| Evaluation | | | | | | | | | |
| Extreme-pressure property evaluation test (h) | 220 | 200 | 165 | 140 | 220 | 190 | 170 | 140 | 160 |
| High-temperature and high-speed test (h) | 3680 | 3250 | 3920 | 2400 | 3830 | 2310 | 2970 | 3060 | 2400 |
| Comprehensive evaluation | Good | Good | Good | Good | Good | Good | Good | Good | Good |

| | Comparative example | | | | | |
|---|---|---|---|---|---|---|
| | 1 | 2 | 3 | 4 | 5 | 6 |
| Mixing ratio (wt %) Grease Base oil | | | | | | |
| PAO oil[1] | 80 | 82 | 77 | 75 | — | — |
| Mineral oil | — | — | — | — | 86 | 81 |
| Thickener | | | | | | |
| Octylamine | — | 8.1 | — | — | — | — |
| Cyclohexylamine | 8 | — | — | 8 | — | — |
| p-toluidine | — | — | 9.7 | — | — | — |
| Diphenylmethane diisocyanate[2] | 10 | 7.9 | 11.3 | 10 | — | — |
| Lithium soap | — | — | — | — | 12 | 12 |

TABLE 1-continued

| | | | | Additive | | |
|---|---|---|---|---|---|---|
| ZnDTC[3] | — | — | — | — | — | — |
| ZnDTP[4] | — | — | — | — | — | — |
| MoDTC[5] | — | — | — | 5 | — | 5 |
| Amine-based antioxidant | 2 | 2 | 2 | 2 | 2 | 2 |
| Viscosity of base oil (mm²/s, 40° C.) | 46 | 46 | 46 | 46 | 100 | 100 |
| | | | | Evaluation | | |
| Extreme-pressure property evaluation test (h) | 39 | 70 | 22 | 9 | 16 | 54 |
| High-temperature and high-speed test (h) | 2820 | 3100 | 2800 | 1640 | 270 | 200 |
| Comprehensive evaluation | Bad | Bad | Bad | Bad | Bad | Bad |

[1] Shin-fluid 801 (Nippon Steel Chemical Co., Ltd.)
[2] Millionate MT (Nippon Polyurethane Industry Co., Ltd.)
[3] Vanlube AZ (R. T. Vanderbilt Company Inc.)
[4] LZ1095 (The Lubrizol Corporation)
[5] Molyvan A (R. T. Vanderbilt Company Inc.)

Each example in which the urea/PAO oil-based grease was used in combination with at least one compound selected from among the ZnDTC and the ZnDTP was excellent in the extreme-pressure property thereof and showed superior heat resistance and durability.

The comparative examples 1 through 4 in which the urea/PAO-based oil was used showed excellent heat resistance and durability but were inferior in the extreme-pressure property thereof. The comparative examples 5 and 6 in which the lithium soap/mineral oil-based grease was used were inferior in the extreme-pressure property, heat resistance, and durability thereof. The comparative examples 4 and 6 in which the molybdenum dithiocarbamate was used as the wear-preventing agent did not show improved extreme-pressure property.

INDUSTRIAL APPLICABILITY

Because the grease containing the PAO oil as the base oil thereof and at least one compound selected from among the ZnDTC and the ZnDTP both excellent in the heat resistance and durability thereof as the additive thereof is used for the rotation-transmitting apparatus with the built-in one-way clutch of the present invention, the rotation-transmitting apparatus with the built-in one-way clutch is capable of keeping its wear-preventing effect for a long time. Therefore the rotation-transmitting apparatus with the built-in one-way clutch can be preferably utilized for railway vehicles, construction machines, electric auxiliary machines for cars, and the like demanded to have a high wear resistance and durability for a long time.

EXPLANATION OF REFERENCE SYMBOLS AND NUMERALS

Figure 1:
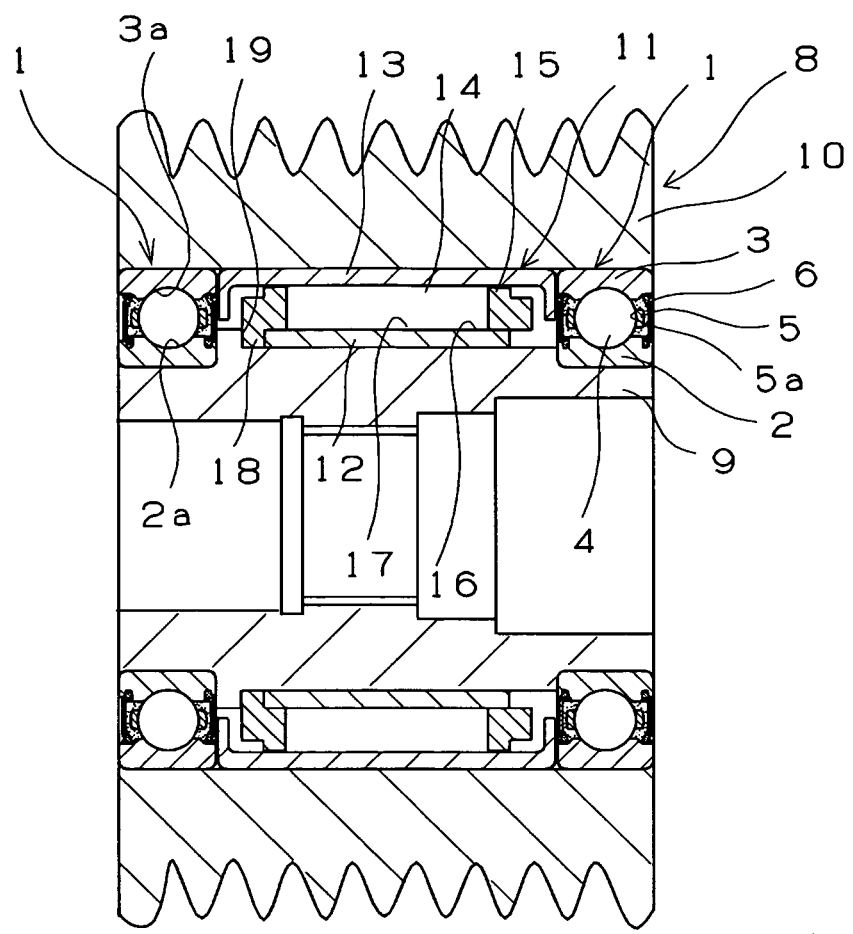
FIG. 1 is a sectional view showing a rotation-transmitting apparatus with a built-in one-way clutch.
Figure 2:
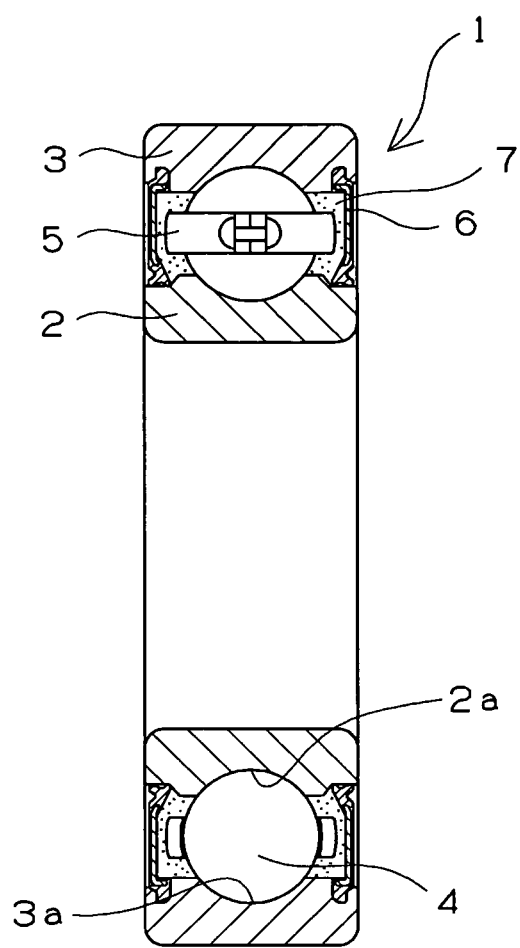
FIG. 2 is a sectional view of a rolling bearing.
Figure 3:
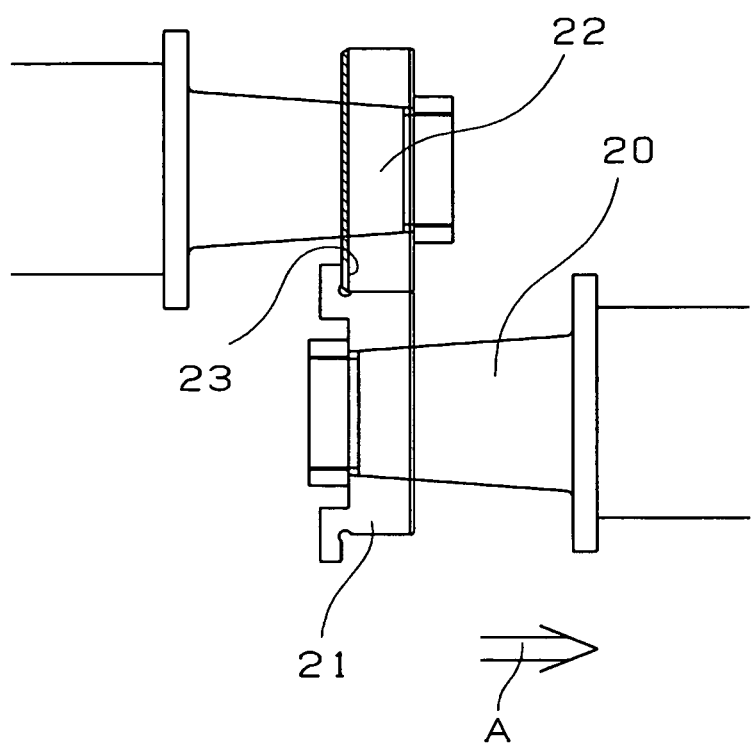
FIG. 3 shows an apparatus for conducting an extreme-pressure property evaluation test.

1: rolling bearing
2: inner ring
2a: rolling surface of inner ring
3: outer ring
4: ball (rolling element)
5: cage
6: sealing member
7: grease composition
8: rotation-transmitting apparatus with built-in one-way clutch
9: sleeve
10: pulley
11: roller clutch
12: inner ring for clutch
13: outer ring for clutch
14: roller
15: cage for clutch
16: cam surface
17: concavity
18: convexity
19: level-different surface
20: rotational shaft
21: ring-shaped specimen
22: ring-shaped specimen
23: end surface

The invention claimed is:
1. A rotation-transmitting apparatus with a built-in one-way clutch comprising:
an inside rotational member; a cylindrical outside rotational member disposed concentrically with said inside rotational member; a one-way clutch disposed between an outside surface of said inside rotational member and an inside surface of said outside rotational member and connecting said outside surface of said inside rotational member and said inside surface of said outside rotational member to each other only when said outside rotational member rotates at a higher speed than said inside rotational member; and a pair of rolling bearings disposed at both sides of said one-way clutch in an axial direction thereof and allowing said inside rotational member and said outside rotational member to rotate relative to each other with said rolling bearings receiving a radial load applied between said inside rotational member and said outside rotational member,
wherein a grease is enclosed inside an internal space of said one-way clutch where a plurality of rollers composing said one-way clutch is mounted and inside a space where a plurality of rolling elements composing said rolling bearings is mounted; and
said grease consists of a base oil, a thickener, and an additive, wherein said base oil is poly-α-olefin oil having a kinematic viscosity of 30 to 70 mm²/s at 40° C.;

a mixing ratio of said poly-α-olefin oil is set to 70 to 95 wt % for the entire amount of said grease;

said thickener is a urea-based compound indicated by the following formula (1), (Chemical formula 1)

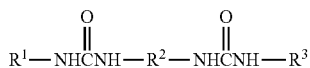

(1)

wherein $R^1$ and $R^3$ indicate hydrocarbon groups having 6 to 20 carbon atoms, $R^1$ and $R^3$ may be identical to or different from each other, and $R^2$ indicates an aromatic hydrocarbon group having 6 to 15 carbon atoms;

said urea-based compound is prepared by a reaction between diisocyanate and monoamine; said diisocyanate is diphenylmethane diisocyanate; and said monoamine is cyclohexylamine;

said additive consists of dithiozinc carbamate, dithiozinc phosphate and amine based antioxidant; and 0.01 to 15 wt % of said dithiozinc carbamate and 0.01 to 15 wt % of said dithiozinc phosphate are contained for the entire amount of said grease.

2. The rotation-transmitting apparatus with the built-in one-way clutch according to claim 1, wherein 2 to 6 wt % of said dithiozinc carbamate and 2 to 6 wt % of said dithiozinc phosphate are contained for the entire amount of said grease.

* * * * *